United States Patent
Dutta et al.

(10) Patent No.: US 9,360,560 B2
(45) Date of Patent: Jun. 7, 2016

(54) PERFORMING GPS OPERATIONS IN RECEIVER SENSOR ENGINE AND POSITION ENGINE

(71) Applicant: Texas Instruments Incorporated, Dallas, TX (US)

(72) Inventors: Goutam Dutta, Karnataka (IN); Tarkesh Pande, Richardson, TX (US); Sandeep Rao, Karnataka (IN); Deric W. Waters, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/686,310

(22) Filed: Apr. 14, 2015

(65) Prior Publication Data
US 2015/0219768 A1    Aug. 6, 2015

Related U.S. Application Data

(62) Division of application No. 13/163,199, filed on Jun. 17, 2011, now Pat. No. 9,030,356.

(51) Int. Cl.
| | |
|---|---|
| *G01S 19/47* | (2010.01) |
| *G01C 21/16* | (2006.01) |
| *G01S 19/20* | (2010.01) |
| *G01S 19/49* | (2010.01) |
| *G01S 19/52* | (2010.01) |

(52) U.S. Cl.
CPC ............... *G01S 19/47* (2013.01); *G01C 21/165* (2013.01); *G01S 19/20* (2013.01); *G01S 19/49* (2013.01); *G01S 19/52* (2013.01)

(58) Field of Classification Search
CPC ........ G01S 19/47; G01S 19/52; G01C 21/165
USPC .................................................. 701/480, 501
See application file for complete search history.

(56) References Cited

U.S. PATENT DOCUMENTS

| | | | | |
|---|---|---|---|---|
| 8,311,740 | B2 * | 11/2012 | Chansarkar | G01S 19/26 342/357.3 |
| 2002/0173910 | A1 * | 11/2002 | McCall | G01C 21/16 701/501 |
| 2011/0001663 | A1 * | 1/2011 | Anand | G01S 19/40 342/357.23 |

* cited by examiner

*Primary Examiner* — Tan Q Nguyen
(74) *Attorney, Agent, or Firm* — Lawrence J. Bassuk; Frank D. Cimino

(57) ABSTRACT

Embodiments of the disclosure provide a cross coupled position engine architecture for sensor integration in a Global Navigation Satellite System. In one embodiment, a data processing engine for processing inertial sensor data within a positioning system receiver is disclosed. The data processing engine includes a first input for receiving the sensor data, and a second input for receiving a positioning data. The data processing system also includes a memory and a processor. The processor of the data processing system is coupled to the memory and to the first and second input. The processor of the data processing system is configured to calculate a net acceleration profile data from the inertial sensor data and from the positioning data. The net acceleration profile data calculated by the processor of the data processing system is used for the Global Positioning System (GPS) receiver to subsequently calculate a position and a velocity data.

5 Claims, 6 Drawing Sheets

PERFORMING GPS OPERATIONS IN RECEIVER SENSOR ENGINE AND POSITION ENGINE

This application is a divisional of prior application Ser. No. 13/163,199, filed Jun. 17, 2011, now U.S. Pat. No. 9,030,356, issued May 12, 2015.

FIELD OF TECHNOLOGY

Global Navigation Satellite system (GNSS) and, more particularly, to cross coupled Positioning Engine (PE) architecture for sensor integration Engine in Global Navigation Satellite System (GNSS).

BACKGROUND

A satellite-based navigation system may suffer from performance degradation when a satellite signal is unavailable, blocked, attenuated and/or reflected. Example locations where the satellite-based navigation system suffer from performance degradation may include indoors and/or urban canyons. A Global Navigation Satellite system (GNSS) receiver may be integrated with a sensor-based Inertial Navigation System (INS) to improve performance when some or all satellite signals are not available or attenuated.

In some architecture of GNSS receivers, a sensor input may be provided directly as one of inputs to a position engine of a GNSS receiver for computing position information. However, in such architectures, the position engine may be designed for computing and calibrating an output (e.g., velocity data, position data, time drift) based on the type of predetermined sensors. Such architectures may not support any change in the type of sensor being used in the receiver. If there is a requirement for a modification of the type of sensor being used or new sensors are to be added to the receiver, the architecture of the GNSS receiver may have to be redesigned.

SUMMARY

Disclosed are a method, an apparatus, and a system to Cross coupled PE Architecture for sensor integration in a Global Navigation Satellite System (GNSS).

In one aspect, a data processing engine for processing inertial sensor data within a positioning system receiver is disclosed. The positioning system is a Global Positioning System (GPS) or GNSS. The data processing engine as described herein is a Sensor Engine (SE). The data processing engine includes a first input for receiving the sensor data, and a second input for receiving a positioning data. The positioning data may be a fractional or a complete component of satellite data. The data processing system also includes a memory and a processor. The processor of the data processing system is coupled to the memory and to the first and second input. The processor of the data processing system is configured to calculate a net acceleration profile data from the inertial sensor data and from the positioning data. The net acceleration profile data calculated by the processor of the data processing system is used for the GPS receiver to subsequently calculate a position and a velocity data.

In another aspect, a data processing engine for processing data within a positioning system is disclosed. The data processing engine as described herein is a Position Engine (PE). The data processing engine includes a first input for receiving an acceleration profile from a separate engine, and a second input for receiving a positioning data. In addition, the data processing engine also includes an output and a memory coded with firmware. The data processing engine as described herein includes a fixed architecture circuit coupled to the first input, the second input, the output, and the memory. The fixed architecture circuit of the data processing engine computes a velocity vector data and a position vector data from the satellite data and the acceleration profile.

In yet another aspect, a receiver for processing data signals to determine a position or a velocity of the receiver is disclosed. The receiver as described herein is a Global Positioning System (GPS). The receiver includes a first data-processing engine having an input to receive satellite information for use in determining the position or the velocity of the receiver. The receiver also includes a second data-processing engine coupled to the first data-processing engine. The second data-processing engine has an input to receive the satellite information in parallel to the first data-processing engine. The second data-processing engine is configured to process the satellite data for calculating an acceleration profile data.

In still yet another aspect, a GPS receiver for processing data signals to determine position or velocity is disclosed. The receiver includes an antenna for receiving satellite information for use in an algorithm to determine position and velocity. The receiver also includes two or more data-processing engines coupled to each other. The two or more data-processing engines are configured to perform Receiver Autonomous Integrity Monitoring (RAIM) of the satellite information in parallel.

In yet still another aspect, a GPS system is disclosed. The GPS system includes a transmitter, and a receiver unit. The transmitter may be a satellite. The receiver is configured to receive a signal from one or more transmitters. The receiver unit includes a first data-processing engine and a second data-processing engine coupled to each other. The first data-processing engine includes an input to receive satellite information for use in determining the position or the velocity of the receiver. Also, the second data-processing engine of the GPS system includes an input to receive the satellite information in parallel to the first data-processing engine. The second data-processing engine as described herein is configured to process the satellite data for calculating an acceleration profile data.

In another aspect, a method of processing sensor data in a data processing engine having a processor coupled to a memory, an input and an output is disclosed. The method includes receiving sensor data at the input of the data processing engine. In addition, the method also includes calculating an acceleration profile. The method also includes receiving a satellite information from one or more of GPS satellites at the input of the processing engine.

In yet another aspect, a method of calculating a position and velocity data in a data processing engine having an Application Specific Integrated Circuit (ASIC) coupled to a memory and to an input and output is disclosed. The method includes receiving satellite information of ephemerides from GPS satellites at the input of the data processing engine. In addition, the method includes receiving a net acceleration profile data at the input of the processing engine. The method also includes calculating an updated position and velocity data from the satellite information and the net acceleration profile data.

In still another aspect, a method of calculating position or velocity data of a GPS receiver unit is disclosed. The method includes receiving satellite information of ephemerides from a plurality of GPS satellites at an input to the receiver unit. The method also includes communicating the satellite information to both a Position Engine (PE) and a Sensor Engine (SE). The PE and the SE are configured to process the satellite information in parallel.

In yet still another aspect, a method of reprogramming a GPS receiver having a fixed architecture engine coupled to a reprogrammable engine is disclosed. The method includes receiving at the programmable engine portion of the receiver, one item selected from a group of a modified algorithm, a modified sensor type of data, a modified sensor configuration information, and a combination of any of these items. In addition, the method includes reprogramming the programmable engine to perform one item selected from a group consisting of the modified algorithm, the modified sensor type of data, the modified sensor configuration information, and the combination of any of these items. The method also includes substantially maintaining the architecture or firmware configuration of the fixed architecture engine to maintain the qualification status without needing to re-qualify.

The methods, systems, and apparatuses disclosed herein may be implemented in any means for achieving various aspects. Other features will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, an apparatus and/or system for cross coupling Position Engine (PE) architecture for sensor integration in a Global Navigation Satellite System (GNSS). Although the present embodiments have been described with reference to specific example embodiments, it will be evident that various modifications and changes may be made to these embodiments without departing from the broader spirit and scope of the various embodiments.

Figure 1A:
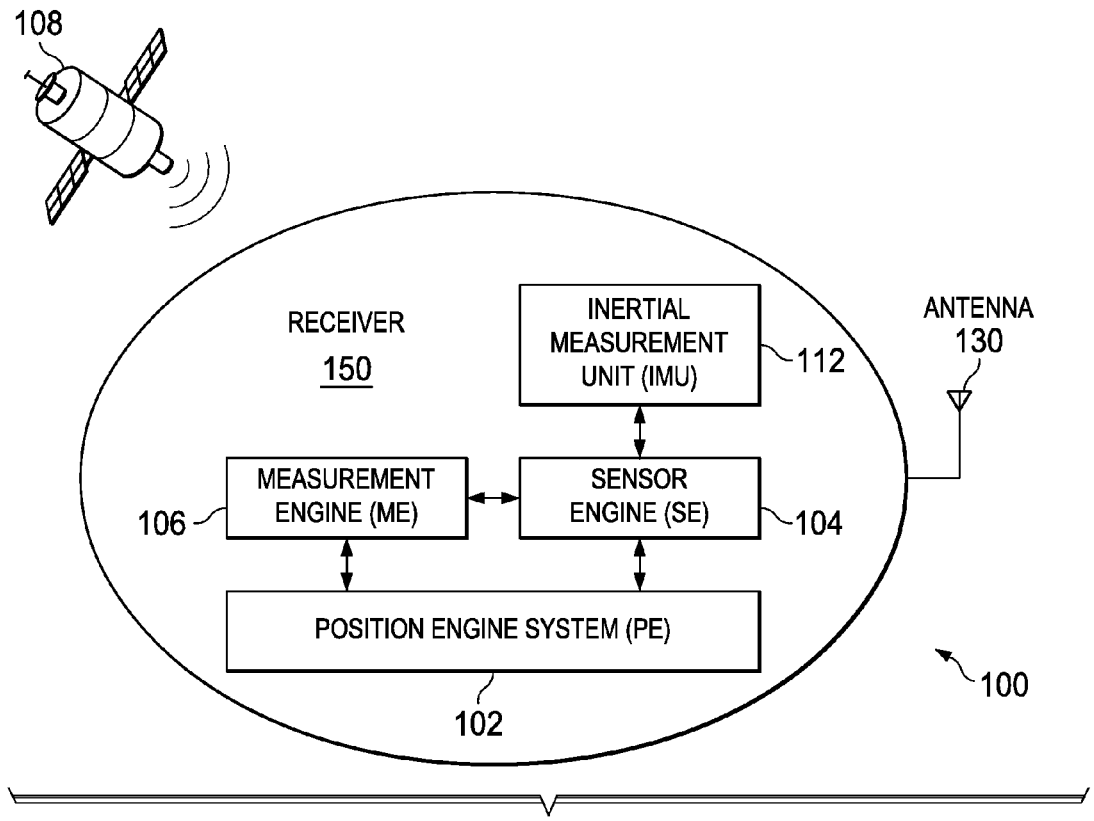
FIG. 1A is a system view of a Global Navigation Satellite System (GNSS).

FIG. 1A is a system view of a GNSS 100, according to an embodiment of the disclosure. The GNSS 100 includes a GPS satellite 108 and a receiver 150. Receiver 150 includes a Position Engine (PE) 102, a Sensor Engine (SE) 104, a Measurement Engine (ME) 106, and an Inertial Measurement Unit (IMU) 112. is a system view of a GNSS 100, according to an embodiment of the invention. The GNSS 100 includes a GPS satellite 108 and a receiver 150. Receiver 150 includes a Position Engine (PE) 102, a Sensor Engine (SE) 104, a Measurement Engine (ME) 106, and an Inertial Measurement Unit (IMU) 112.

Receiver 150 further includes an antenna 130 designed to receive navigation data from satellite 108 (or alternatively, from a pseudolite or any other positioning system). The navigation data includes, but is not limited to, a satellite pseudo-range, satellite vehicle information, delta range measurement for each satellite and Doppler signals. The navigation data received through antenna 130 may be processed by ME 106 to generate a measurement data to be communicated to SE 104 and/or PE system 102.

SE 104 of receiver 150 is configured to detect a spatial inertial change of receiver 150 to generate an acceleration profile or to compute position and velocity information based on input obtained from one or more sensors of IMU 112. SE 104 may include an Inertial Navigation System (INS) calibration component to process the input data obtained from the one or more sensors of IMU 112. IMU 112 may include inertial sensors such as accelerometer(s), gyroscope(s), e-compass(es) and/or altimeter(s), to provide an acceleration data, angular/orientation data, direction data and/or altitude data respectively as the input to the SE 104.

PE system 102 may include an interface to receive calibrated data (e.g., acceleration vector, positional data and velocity vector) from SE 104 of receiver 150 at periodic intervals. Additionally, PE system 102 may also include another dedicated interface to receive the measurement data from the ME 106. The PE SYSTEM 102 may also include more interfaces to receive data from other positioning technologies and the like. The calibrated data obtained from SE 104 and the measurement data obtained from ME 106 may be used by PE system 102 to generate an output. The output generated by PE system 192 may be a velocity vector data and a position vector data of receiver 150. The logical illustration of the aforementioned receiver 150 is described in FIG. 1B.

Figure 1B:
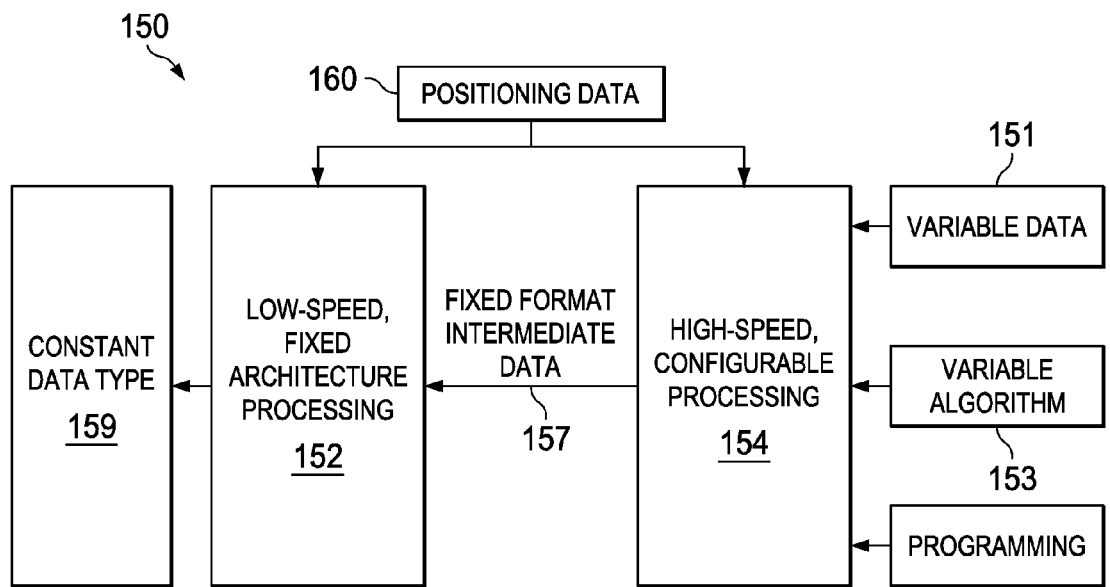
FIG. 1B is a logical view illustrating components of receiver.

FIG. 1B is a logical view illustrating components of receiver 150. FIG. 1B illustrates an architecture, where a high-speed, configurable processing unit 154 is electrically coupled externally to a low-speed fixed architecture processing 152. High-speed, configurable processing unit 154 as described herein is analogous to SE 104 (e.g., the SE of FIG. 1A) and is explained in FIG. 3. Low-speed fixed architecture processing 152 as described herein is analogous to PE SYSTEM 102 (e.g., the PE SYSTEM 102 of FIG. 1A) and is explained in FIG. 4.

High-speed, configurable processing unit 154 is configured to process a variable data 151 (e.g., sensor inputs) from one or more inertial sensor sources (e.g., the IMU 112). Variable data 151 may be processed using one or more algorithms 153. One or more algorithms 153 for computing the variable data are input to high-speed, configurable processing unit 154 through an interface provided thereof. Further, one or more algorithms 153 used for computing the variable data 151 in high-speed, configurable processing unit 154 may be modifiable and can be updated. Also, additional algorithms can be input into the high-speed, configurable processing unit 154 through the interface provided thereof.

High-speed, configurable processing unit 154 may also be configured to receive a positioning data 160 from a source such as a transmitter, satellite, a pseudolite, wireless based positioning, cellular based positioning or any other positioning technologies at various data rates. Positioning data 160 received by high-speed, configurable processing unit 154 from the source may be a partial positioning data (or fractional data) or a complete positioning data. In addition, high-speed, configurable processing unit 154 may be configured to receive positioning data such as position data and/or velocity data computed by low-speed, fixed architecture processing unit 152. Also, high-speed, configurable processing unit 154 may be configured to receive positioning data such as position data and velocity data from other positioning technologies such as WiFi™ based positioning technology and cellular based positioning technology. In some embodiments of the disclosure, high-speed, configurable processing unit 154 may not receive any positioning data, thereby driving the high-speed, configurable processing unit 154 to use variable data 151 (e.g., dead reckoning) for computing velocity data and position data.

High-speed, configurable processing unit 154 may also be configured to perform a runtime calibration to generate a fixed format intermediate data 157 using variable data 151 and/or positioning data 160 at periodic intervals, in addition to performing a receiver autonomous integrity monitoring (RAIM) on positioning data 160. A Kalman filter may be used to integrate/blend variable data 151 and positioning data 160 to enable high-speed, configurable processing unit 154 to perform a runtime calibration to generate a fixed format intermediate data 157.

Fixed format intermediate data 157 is a net acceleration profile data, or an absolute position and velocity data analogous to the calibrated data as described in FIG. 1B. The net acceleration profile data is an average acceleration profile that takes into account uncertainty data from an algorithm that compares a short-term accuracy of inertial guidance with a longer term accuracy of the satellite data.

Further, low-speed, fixed architecture processing unit 152 is configured to receive the net acceleration profile data or absolute velocity and/or position data in a form of fixed format intermediate data 157 periodically from high-speed, configurable processing unit 154 and/or the positioning information from positioning data 160 to generate an output (e.g., a velocity vector data and a position vector data) of a constant data type 159 at a predetermined data rate. Low-speed, fixed architecture processing unit 152 may be include algorithms to determine whether to use the net acceleration profile data, positioning data 160, and/or the absolute velocity and position data to generate an output representing a position of the receiver 150. The output may be communicated to receiver 150 for further processing.

Figure 2:
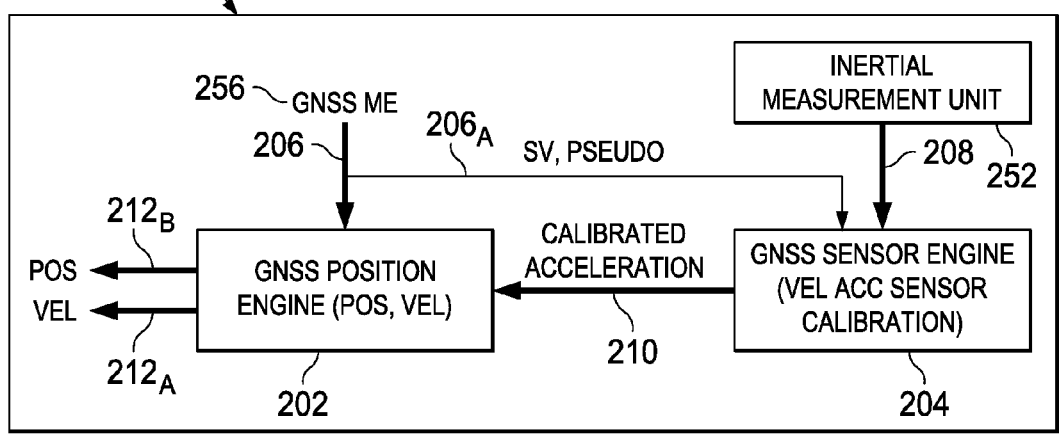
FIG. 2 is a system view of the receiver illustrated in FIG. 1B.

FIG. 2 is a system view 200A of the receiver 150 illustrated in FIG. 1B. As described in FIG. 1B, a GNSS SE 204 is analogous to high-speed, configurable processing unit 154 and a GNSS PE 202 is analogous to low-speed, fixed architecture processing unit 152. GNSS PE 202 and GNSS SE 204 may be implemented on the same Integrated Circuit (IC). Alternatively, GNSS PE 202 and GNSS SE 204 may be designed on different ICs in the receiver 150. GNSS SE 204 (e.g., or a calibration engine) may be placed external to GNSS PE 202 to enable high-speed processing of input data to generate the fixed format intermediate data (output) at a fixed data rate. Described below are some embodiments illustrating implementations of data processing engine described in aforementioned figures of the receiver.

In one embodiment, GNSS SE 204 may be configured to receive one or more sensor inputs 208 from an IMU 252 at data rates appropriate for a specific navigation application. In addition, GNSS SE 204 may also be configured to receive a positional data 206A from GNSS ME 256 at a predetermined moment of time or at every GNSS epoch. The positional data may include a satellite pseudo-range, and a Doppler or a delta range. IMU 252 may be a component of receiver 150 that obtains sensor input from sensor devices such as, but not limited to, accelerometer(s) and gyroscope(s). The sensor input as described herein may include, but is not limited to, an acceleration data, a velocity data, a directional data, an altimeter data, and a barometric pressure data.

GNSS SE 204 may be configured to apply RAIM on the input positional data 206A to remove all erroneous positional information in input positional data 206. The RAIM qualified positional data may be blended/integrated with the sensor inputs to generate a velocity data and a net acceleration profile at every GNSS epoch. The velocity data and/or the generated net acceleration profile may be communicated to GNSS PE 202 at every GNSS epoch.

GNSS PE 202 may be configured to receive the velocity data and/or the net acceleration profile from GNSS SE 204 at a periodicity of output data rate. In addition, GNSS PE 202 may also be configured to receive a positional data 206 such as a satellite pseudo-range, and a Doppler or a delta range from GNSS ME 256. Further, GNSS PE 202 may be configured to apply RAIM on positional data 206 to remove erroneous positional information in positional data 206. The RAIM qualified positional data 206 may be integrated/blended with net acceleration profile and a velocity vector 212A and a position vector 212B may be generated. In one example embodiment, Kalman filter algorithm may be used for integrating/blending RAIM qualified positional data 206 and the net acceleration profile.

In another embodiment, GNSS SE 204 may be configured to receive one or more sensor inputs 208 from an IMU 252 at a data rates appropriate for a specific navigation application. GNSS SE 204 may also be configured to receive a positional data 206A from GNSS ME 256 at a predetermined moment of time or at every GNSS epoch. Also, GNSS SE 204 may be configured to receive additional positional data (not shown in figure) from other positioning technologies such WiFi™ based positioning technology, cellular based positioning technology and pseudolites at data rates based on the respective positioning technology. The data obtained by GNSS SE 204 may be in a form of raw measurements and/or refined position and velocity information.

GNSS SE 204 may also be configured to apply RAIM on all input positional data 206A to remove all erroneous positional information in input positional data 206A. Further, the RAIM qualified positional data and the additional input positional data may be blended/integrated with the sensor inputs to generate a velocity data and a net acceleration profile at every GNSS epoch. The velocity data and/or the generated net acceleration profile may be communicated to GNSS PE 202 at every GNSS epoch.

GNSS PE 202 may be configured to receive the velocity data and/or the net acceleration profile from GNSS SE 204 at a periodicity of output data rate. In addition, GNSS PE 202 may also be configured to receive a positional data 206 such as a satellite pseudo-range, and a Doppler or a delta range from GNSS ME 256. Also, GNSS PE 202 may also be configured to receive additional positional data from the other positioning technologies at a data rate based on the positioning technology providing positioning data.

Further, GNSS PE 202 may be configured to apply RAIM on positional data 206 to remove erroneous positional information in positional data 206. RAIM qualified positional data 206 and the additional positional data may be integrated/blended with the net acceleration profile and a velocity vector 212A and a position vector 212B may be generated. A Kalman filter algorithm may be used for integrating/blending RAIM qualified positional data 206 and the net acceleration profile.

In yet another embodiment, GNSS SE 204 may be configured to receive one or more sensor inputs 208 from an IMU 252 at a data rates appropriate for a specific navigation application. In addition, GNSS SE 204 may also be configured to receive a positional data 206A from GNSS ME 256 at every GNSS epoch. Also, GNSS SE 204 may also be configured to receive positioning data from the other positioning technologies such as from a cellular based positioning. The data obtained by GNSS SE 204 may be in a form of raw measurements and/or refined position and velocity information of the receiver.

GNSS SE 204 may be configured to apply RAIM on all input positional data 206A to remove all erroneous positional information in input positional data 206A. Further, the RAIM qualified positional data and the additional input positional data may be integrated/blended with the sensor inputs to generate a velocity data and a net acceleration profile at every GNSS epoch. The velocity data and/or the generated net acceleration profile may be communicated to the GNSS PE 202 at every GNSS epoch.

GNSS PE 202 may be configured to receive the velocity data and/or the net acceleration profile from GNSS SE 204 at a periodicity of output data rate. In addition, GNSS PE 202 may also be configured to receive a positional data 206 such as a satellite pseudo-range, and a Doppler or a delta range from GNSS ME 256. Further, GNSS PE 202 may be configured to apply RAIM on positional data 206 to remove erroneous positional information in positional data 206. RAIM qualified positional data 206 may be integrated/blended with the net acceleration profile and a velocity vector 212A and a position vector 212B may be generated. In one example embodiment, Kalman filter algorithm may be used for integrating/blending RAIM qualified positional data 206 and the net acceleration profile.

In a further embodiment, GNSS SE 204 may be configured to receive one or more sensor inputs 208 from an IMU 252 at a data rates appropriate for a specific navigation application. In addition, GNSS SE 204 may be configured to receive positional data from the other positional technologies such as the WiFi™ based positioning technology, cellular based positioning technology and pseudolites at data rates based on the respective positioning technology. GNSS SE 204 may also be configured to receive computed position and velocity information from GNSS PE 202.

GNSS SE 204 may be configured to apply RAIM on all input positional data 206A to remove all erroneous positional information in input positional data 206A. Further, the RAIM qualified positional data and the additional input positional data may be blended/integrated with the sensor inputs to generate a velocity data and a net acceleration profile at every GNSS epoch. The velocity data and/or the generated net acceleration profile may be communicated to GNSS PE 202 at every GNSS epoch.

GNSS PE 202 may be configured to receive the velocity data and/or the net acceleration profile from GNSS SE 204 at a periodicity of output data rate. In addition, GNSS PE 202 may also be configured to receive a positional data 206 such as a satellite pseudo-range, and a Doppler or a delta range from GNSS ME 256. Further, GNSS PE 202 may be configured to apply RAIM on positional data 206 to remove erroneous positional information in positional data 206. RAIM qualified positional data 206 may be integrated/blended with the net acceleration profile and a velocity vector 212A and a position vector 212B may be generated. A Kalman filter algorithm may be used for integrating/blending RAIM qualified positional data 206 and the net acceleration profile. Also, GNSS PE 202 may be configured to generate a velocity data and the position data based on positional data 206 obtained from the GNSS ME 256. The generated velocity data and the position data may be communicated to GNSS SE 204 for further computation.

In yet another embodiment, GNSS SE 204 may be configured to receive one or more sensor inputs 208 from an IMU 252 at a data rates appropriate for a specific navigation application. In addition, GNSS SE 204 may be configured to receive computed position and velocity information from GNSS PE 202.

GNSS SE 204 may be configured to apply RAIM on the input positional data obtained from GNSS PE 202 to remove all erroneous positional information in the input positional data. Further, the RAIM qualified positional data may be blended/integrated with the sensor inputs obtained from IMU 252 to generate a velocity data and a net acceleration profile at every GNSS epoch. The velocity data and/or the generated net acceleration profile may be communicated to GNSS PE 202 at every GNSS epoch.

GNSS PE 202 may be configured to receive the velocity data and/or the net acceleration profile from GNSS SE 204 at a periodicity of output data rate. GNSS PE 202 may also be configured to receive a positional data 206 such as a satellite pseudo-range, and a Doppler or a delta range from GNSS ME 256. GNSS PE 202 may also be configured to receive additional positional data from the other positioning technologies such as the WiFi™ based positioning technology, and cellular based positioning technology.

Further, GNSS PE 202 may be configured to apply RAIM on positional data 206 to remove erroneous positional information in positional data 206. RAIM qualified positional data 206 and the additional positional data may be integrated/blended with the net acceleration profile. Further, a velocity vector 212A and a position vector 212B may be generated using the integrated/blended data. A Kalman filter algorithm may be used for integrating/blending RAIM qualified positional data 206 and the net acceleration profile. Also, GNSS PE 202 may be configured to generate a velocity data and the position data based on the positional data obtained from GNSS ME 256 and the additional positional data obtained from the other positioning technologies. The generated velocity data and the position data may be communicated to GNSS SE 204 for further computation.

Velocity vectors 212A and position vector 212B generated by GNSS PE 202 may also be communicated to receiver 150 for further processing.

Figure 3:
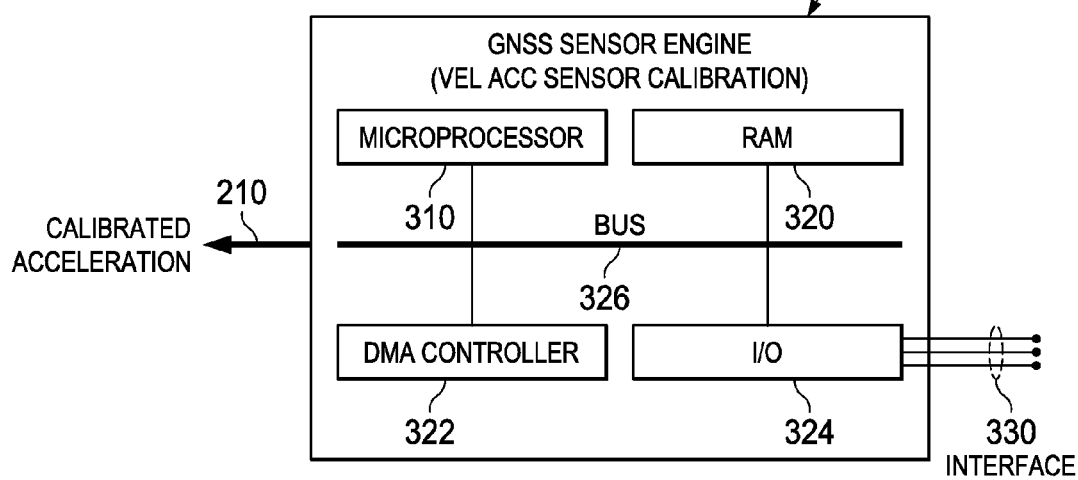
FIG. 3 is a system view of a sensor engine of the receiver illustrated in FIG. 2.

FIG. 3 is a system view of a GNSS SE 204 of the receiver illustrated in FIG. 2. GNSS SE 204 may include a microprocessor 310, a Random Access Memory (RAM) 320, a DMA controller 322, an I/O 324 and a bus 326 coupling the aforementioned components of the GNSS SE 204.

As described, GNSS SE 204 is configured to receive a sensor input and positioning data through two or more interfaces 330 of I/O 324. I/O 324 includes interfaces 330 to receive the sensor input, positioning data, additional positioning data, and/or additional input from GNSS PE 202. Further, the sensor data may be received through an interface at a first data rate and/or the positioning data may be received through another interface at a second data rate. Other additional positioning data and/or additional input may be received at a data rate as defined by standards. Moreover, the first data rate may be greater than the second data rate. The difference in the data rates may be based on mode of operation of the receiver.

RAM (Random Access Memory) 320 of GNSS SE 204 may be a programmable memory that can be used for storing one or more algorithms such as a Kalman filter algorithm, RAIM algorithm and new algorithms, and input data. The algorithms may be input to GNSS SE 204 through an interface of the I/O dedicated thereof. Although, RAM 320 is described as the memory element of GNSS SE 204, any other reprogrammable memory can be used in place of RAM 320. Microprocessor 310 in GNSS SE 204 may be configured to compute a calibrated acceleration data 210 (e.g., also known as a net acceleration profile) from the sensor data, the positional data, the addition positional data, and/or an input from GNSS PE 202 using a suitable algorithm stored in RAM 320. In addition, microprocessor 310 is also configured to remove erroneous components in the input in the sensor data and positioning data through an application of Kalman filter and RAIM. Although, component microprocessor 310 is used in the disclosure, other types of processing devices such as a microcontroller, Programmable Logic device (PLD), Field Programmable Gate Array (FPGA) and the like may be used in place of microprocessor 310. Communication between the components of GNSS SE 204 through system bus 326 may be controlled through DMA controller 322.

Figure 4:
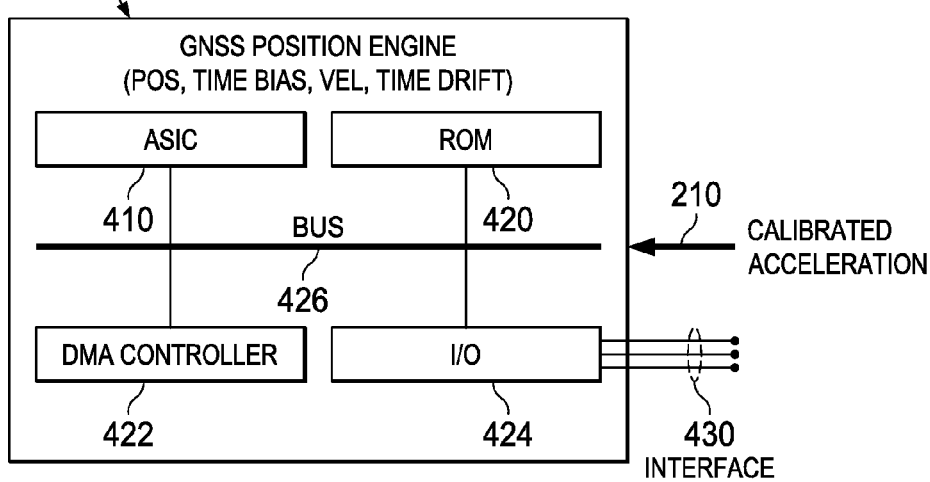
FIG. 4 is a system view of position engine of the receiver illustrated in FIG. 2.

FIG. 4 is a system view of GNSS PE 202 illustrated in FIG. 2, according to an embodiment of the disclosure. GNSS PE 202 may include an ASIC 410, a ROM 420, a DMA controller 422, an I/O 424 communicatively coupled through a system bus 426. DMA controller 422 may be configured to control system bus 426. As discussed previously, GNSS PE 202 may have a fixed architecture to process calibrated acceleration data 210 data and positional data. A fixed architecture may be maintained in GNSS PE 202 as the distilled input (the calibrated acceleration data 210) may be obtained from GNSS SE 204. Further, "distilled" sensor input may be a filtered sensor input or a pre processed sensor input. The distilled input may be a more compact and/or processed version of the positioning data from GNSS ME 256. The distilled information may be sent from GNSS PE 202 to GNSS SE 204, in lieu of the positioning data being sent from GNSS ME 256 to GNSS SE 204. An example of this distilled information may be a weighted least square fix derived from the positioning data sent from GNSS ME 256. A firmware to process calibrated acceleration data 210 data and the positional data may be stored in ROM 420. In addition, a Kalman filter and RAIM algorithm may be stored in ROM 420.

In addition to the above, calibrated acceleration data 210 data and the positional data may be processed by the firmware through ASIC 410 to generate a velocity vector data and a position vector data as an output. Calibrated acceleration data 210 data and the positional data may be obtained through two or more interfaces 430 provided thereof by I/O 424. A Kalman filter and the RAIM may be applied to discard the error data while processing calibrated acceleration data 210 data and the positional data.

Figure 5:
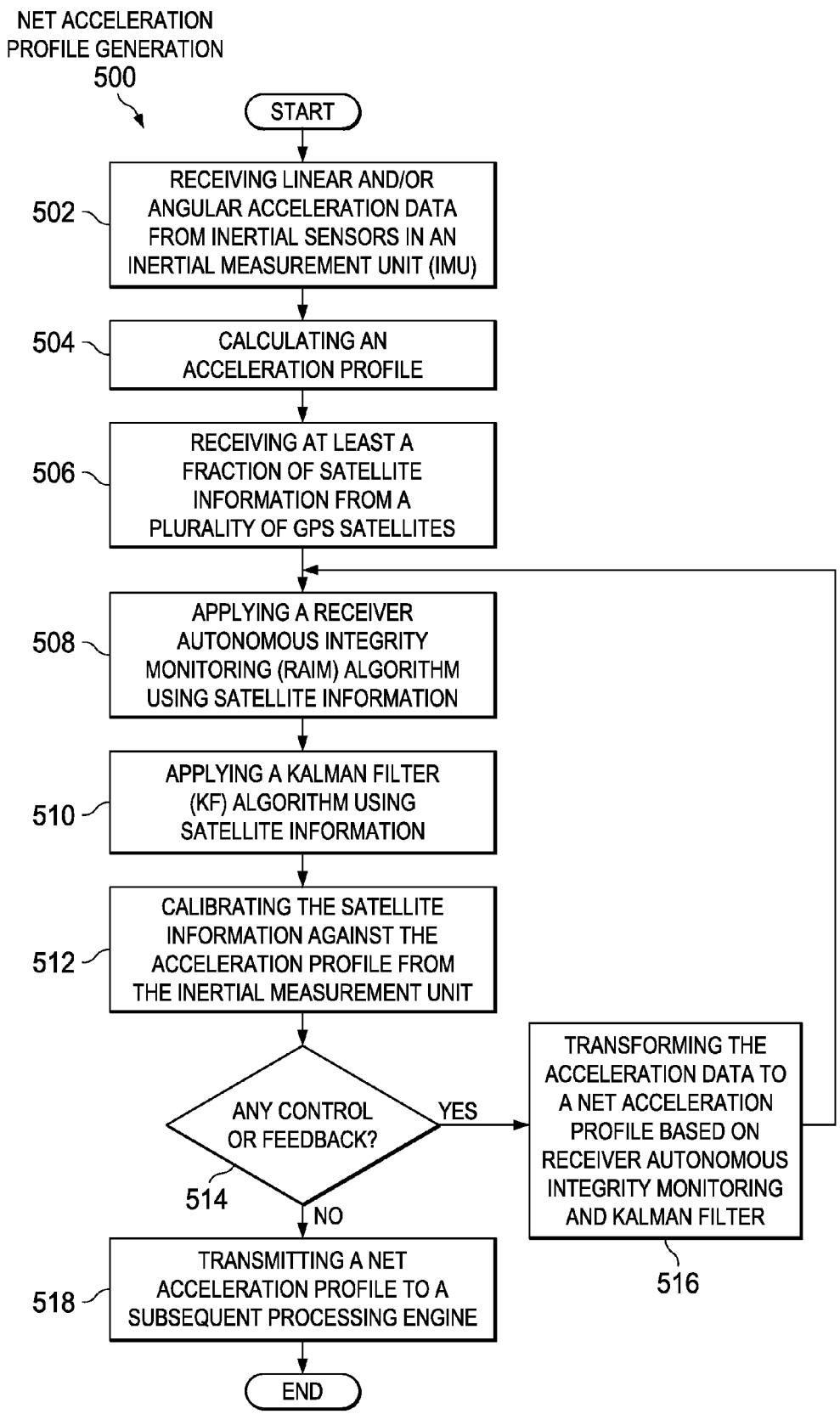
FIG. 5 is a flow chart for generating a net acceleration profile.

FIG. 5 is a flow chart for generating a net acceleration profile 500, according to one or more embodiments. In operation 502, a linear and/or an angular acceleration data is received from inertial sensors through IMU 252. In operation 504, an acceleration profile (or the calibrated acceleration data 210) is calculated. In operation 506, a satellite information (positional data or ephemerides) is received from GPS satellites through GNSS ME 256. In operation 508, a RAIM algorithm is applied using the satellite information. In operation 510, a Kalman Filter (KF) algorithm is applied using the satellite information. In operation 512, the satellite information is calibrated against the acceleration profile from IMU 252. In operation 514, a condition is evaluated to determine accuracy. In operation 514, if the condition evaluates to be true then operation 516 is performed. In operation 516, the acceleration data is transformed to a net acceleration profile based on RAIM and KF and operations 508 to operations 514 may be repeated.

In operation 514, if the condition evaluates to be false then operation 518 is performed. In operation 518, a net acceleration profile is transmitted to a subsequent GNSS PE 202.

Figure 6:
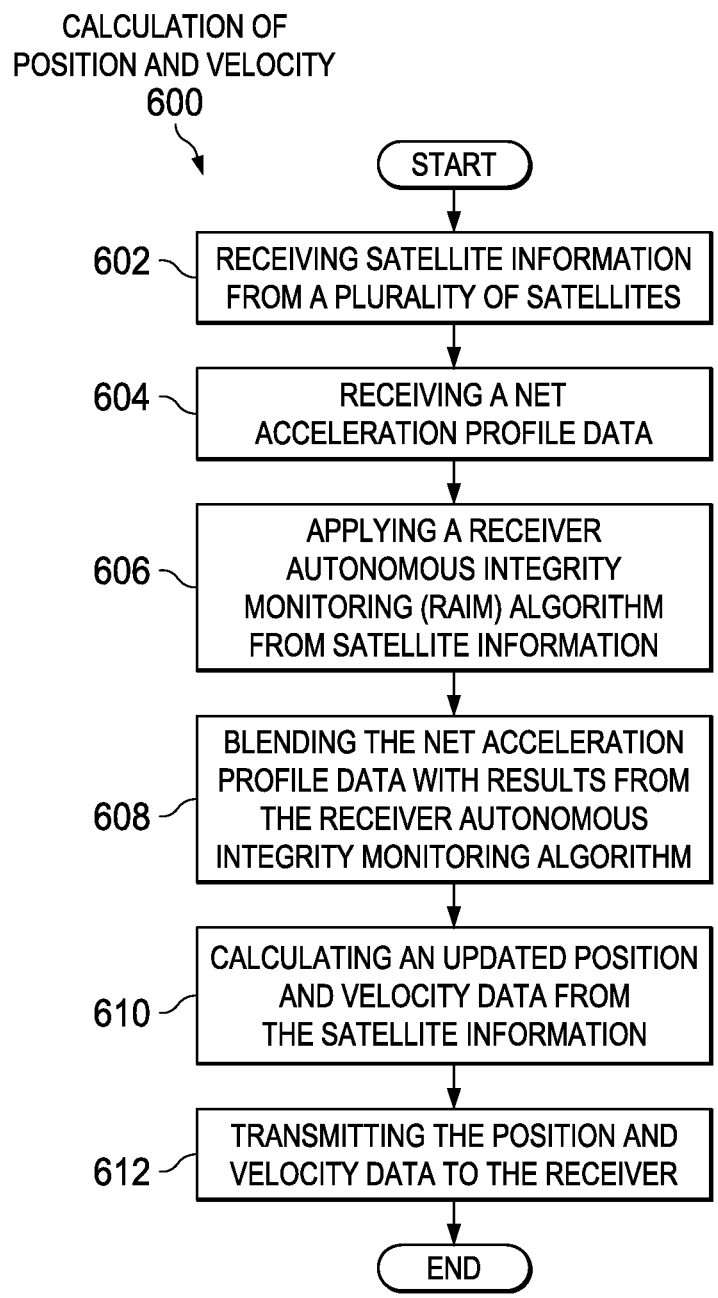
FIG. 6 is a flow chart for generating a position and velocity data through the position engine.

FIG. 6 is a flow chart for generating a position and velocity data through the position engine 600, according to an embodiment of the disclosure. In operation 602, satellite information is received from one or more satellites (optionally from components of other positioning technologies). In operation 604, a net acceleration profile data (or the calibrated acceleration data 210) is received by GNSS PE 202 from GNSS SE 204. In operation 606, a RAIM algorithm is applied on satellite information. In operation 608, the net acceleration profile data is blended with the results from the RAIM algorithm. In operation 610, an updated position (position vector 212B) and velocity data (velocity vector 212A) are calculated from the blended data. In operation 612, the position and the velocity data may be communicated to the receiver.

Figure 7:
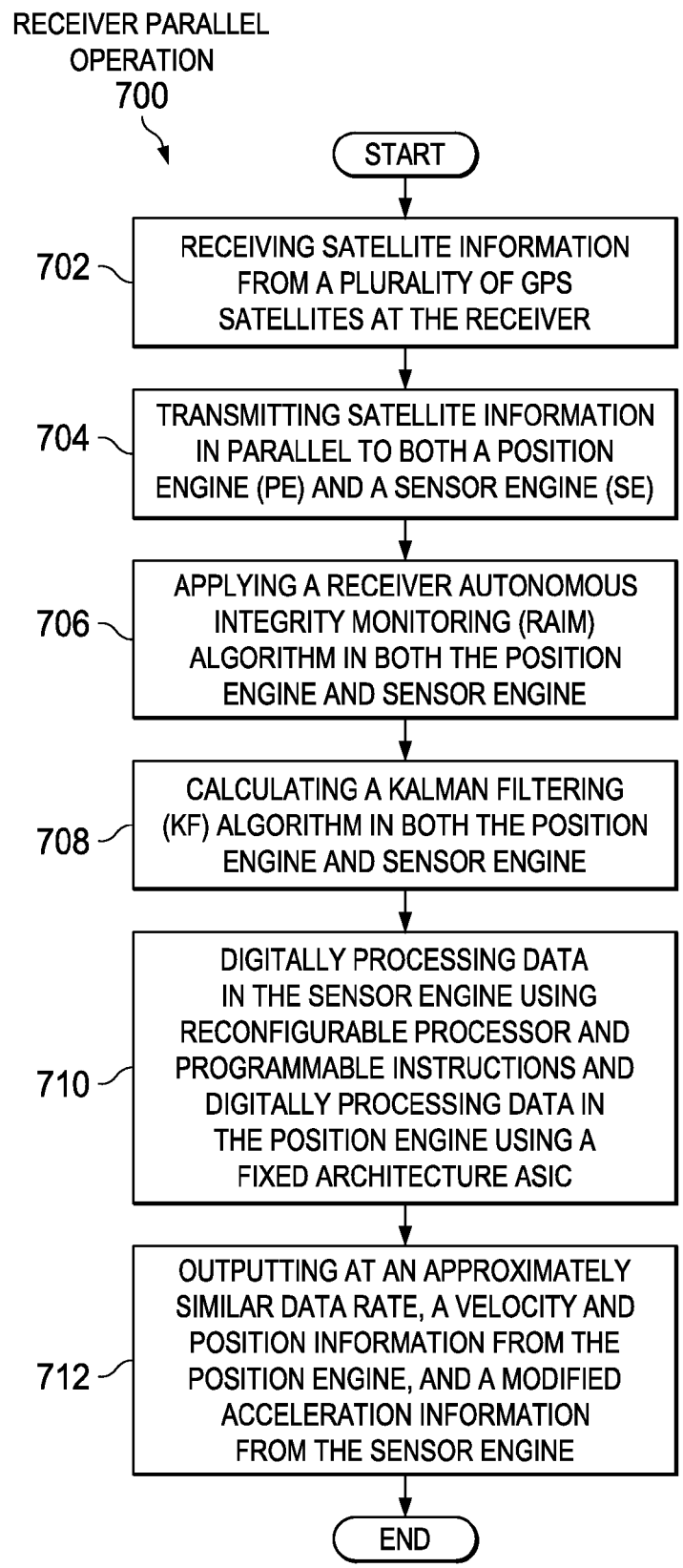
FIG. 7 is a flow chart of performing parallel operations in the sensor engine and the position engine of the receiver.

FIG. 7 is a flow chart of performing parallel operations in the sensor engine and the position engine of receiver 700, according to an embodiment of the disclosure. In operation 702, a satellite information is received from a plurality of GPS satellites at the receiver. In operation 704, satellite information is transmitted in parallel to both GNSS PE 202, and GNSS SE 204. In operation 706, a RAIM algorithm is applied in both GNSS PE 202, and GNSS SE 204. In operation 708, a Kalman Filtering (KF) algorithm is calculated in both GNSS PE 202 and GNSS SE 204. In operation 710, the input sensor data and the positional data in GNSS SE 204 are digitally processed using reconfigurable processor and programmable instructions. Also, in operation 710, calibrated acceleration data 210 and the positional data may be digitally processed in GNSS PE 202 using a fixed architecture ASIC. In operation 712, a velocity data (or position vector) 212A and position data (or position vector) 212B are generated as an output from GNSS PE 202, and a modified acceleration information may be generated and output from GNSS SE 204 at an approximately similar data rate.

Figure 8:
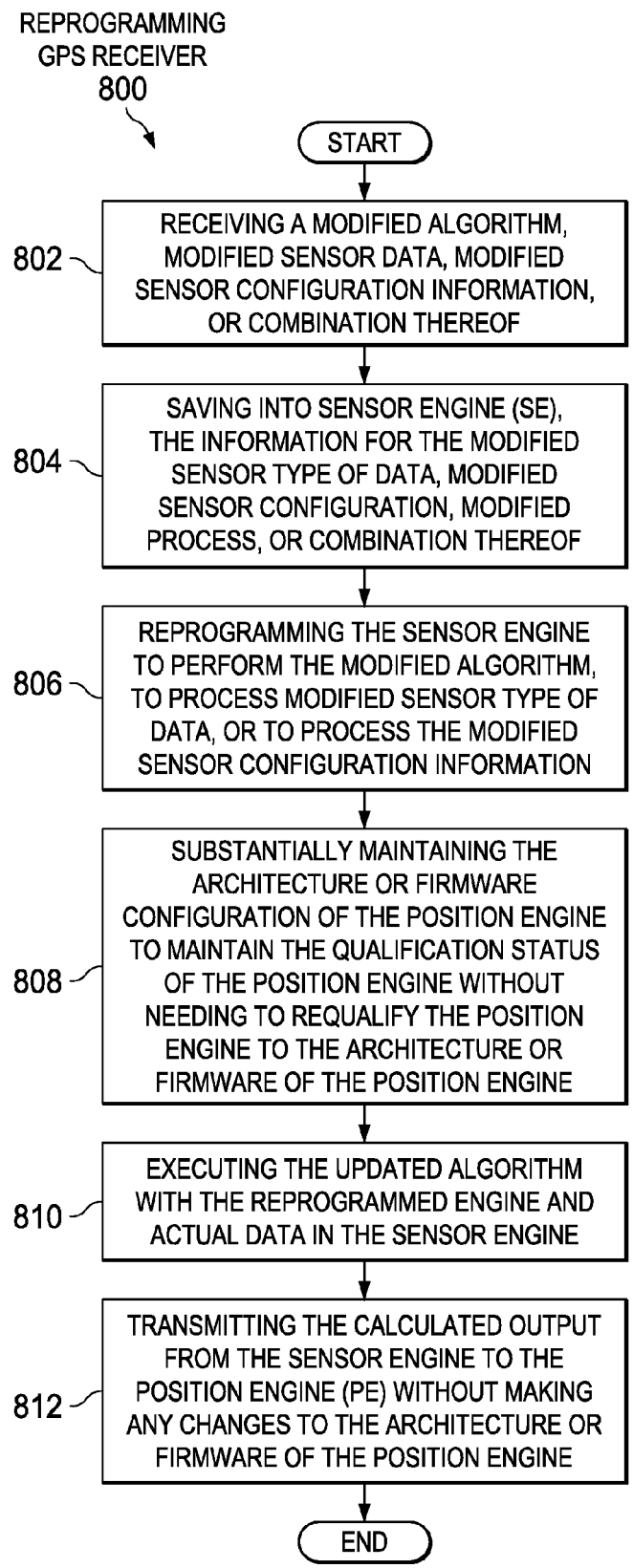
FIG. 8 is a flow chart illustrating a method of reprogramming the receiver.

FIG. 8 is a flow chart illustrating a method of reprogramming the receiver, according to an embodiment of the disclosure. In operation 802, a modified algorithm, modified sensor data, modified sensor configuration information, or combination thereof data are received at GNSS SE 204. In operation 804, the information for the modified sensor type of data, modified sensor configuration, modified process, or combination thereof is saved into GNSS SE 204. In operation 806, GNSS SE 204 is reprogrammed to execute the modified algorithm, and to process modified sensor type of data, or to process the modified sensor configuration information. In operation 808, the architecture or firmware configuration of the GNSS PE 202 is substantially maintained to maintain the qualification status of GNSS PE 202 without needing to requalify GNSS PE 202 to the architecture or firmware of the PE. In operation 810, the updated algorithm is executed with the reprogrammed engine and the actual data in the SE. In operation 812, the calculated output from GNSS SE 204 is transmitted to GNSS PE 202 without making any changes to the architecture or firmware of the PE.

Although the present embodiments have been described with reference to specific example embodiments, it will be evident that various modifications and changes may be made to these embodiments without departing from the broader spirit and scope of the various embodiments.

What is claimed is:

1. A process of performing parallel operations in a data processing sensor engine and a data processing position engine of a receiver, comprising:

receiving satellite information from GPS satellites in an integrated circuit;

transmitting the satellite information in parallel to the data processing position engine and the data processing sensor engine;

performing receiver autonomous integrity monitoring in both the data processing position engine and the data processing sensor engine at the same time;

performing Kalman filtering in both the data processing position engine and the data processing sensor engine;

digitally processing input sensor data and positional data in the data processing sensor engine;

digitally processing calibrated acceleration data and positional data in the data processing position engine;

outputting velocity data and position data from the data processing position engine; and outputting acceleration information from the data processing sensor engine.

2. The process of claim 1 in which the digitally processing input sensor data and positional data in the data processing sensor engine includes using reconfigurable processor circuitry and programmable instructions.

3. The process of claim 1 in which the digitally processing calibrated acceleration data and positional data in the data processing position engine includes using a fixed architecture ASIC.

4. The process of claim 1 in which the outputting velocity data and position data includes outputting a position vector.

5. The process of claim 1 including outputting velocity data and position data from the data processing position engine, and outputting acceleration information from the data processing sensor engine at approximately the same data rate.

* * * * *